D. TUTTLE.
Whiffletree.

No. 59,483.

Patented Nov. 6, 1866.

Witnesses:
John H. Shumway
A. J. Tibbitts

Inventor:
Daul Tuttle
per a cy
John E. Earle

UNITED STATES PATENT OFFICE.

DANIEL TUTTLE, OF PLANTSVILLE, CONNECTICUT.

IMPROVEMENT IN TRACE-LOCKS.

Specification forming part of Letters Patent No. 59,483, dated November 6, 1866.

*To all whom it may concern:*

Be it known that I, DANIEL TUTTLE, of Plantsville, in the county of Hartford and State of Connecticut, have invented a new Improvement in Trace-Locks; and I do hereby declare the following, when taken in connection with the accompanying drawings and the letters of reference marked thereon, to be a full, clear, and exact description of the same, and which said drawings constitute part of this specification, and represent in—

Figure 1:
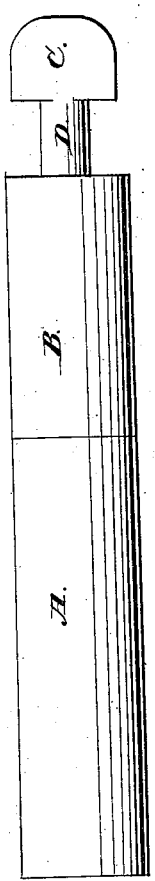
Figure 3:
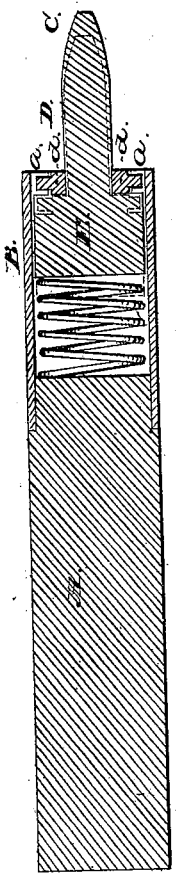
Figure 2:
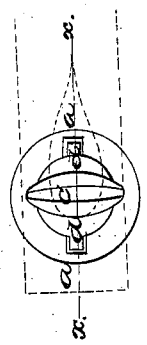

Figure 1 a side view; Fig. 2, an end view; Fig. 3, a longitudinal central section on line $x\ x$, and in Fig. 4 an end view with the tongue turned.

This invention relates to an improvement in the arrangement upon the end of whiffletrees, whereby the trace is securely locked thereto.

To enable others to construct and use my improvement, I will proceed to describe the same as illustrated in the accompanying drawings.

A is the whiffletree; B, the ferrule upon the end of the whiffletree, which also forms a socket to receive a tongue, C. This tongue may be of the usual or any desired form. The shank D, I make round in the usual manner to receive the trace, and by which the carriage is drawn. The said shank D extends into the ferrule or socket B, and is there enlarged to nearly the internal diameter of the socket B, as seen at E, Fig. 3, and between which enlargement and the whiffletree A, I place a coil-spring, as denoted in Fig. 3. The outer end of the socket B is turned inward, forming a flange around the socket, as denoted in Fig. 4, and in which, upon opposite sides, I form notches $a$, and on the shank, which at this part is made of the size to fit the opening through the end of the socket, as seen in Fig. 2, I form ears $d$, corresponding to the notches $a$, as seen in Figs. 2 and 3, so that when the tongue is pressed forward, and the ears and notches corresponding as in Figs. 1, 2, and 3, the ears are forced into the notches by the spring within the socket.

Figure 4:
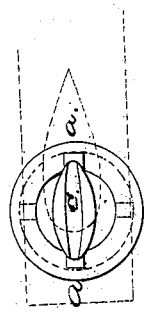

To attach the trace to the whiffletree, depress the tongue, as denoted in red, Fig. 3, and turn it one-fourth around, as in Fig. 4. In this position the trace may be easily placed upon the tongue, as denoted in Fig. 4. Then return the tongue to the position denoted in Figs. 2 and 3. The tongue will be forced forward by the spring and the ears enter the notches, as seen in Figs. 2 and 3, and thus securely lock the tongue, so that the trace cannot without some inconvenience be detached from the whiffletree.

My invention in outward appearance does not differ materially from the common dragon-tongue whiffletree, and the trace may be attached or detached with no more inconvenience than is experienced in that class of whiffletrees without turning the tongue.

By this construction it will be noticed that the cost of constructing the socket and tongue is no more than that of the ferrule and tongue generally used, as both are made from cast metal, the only additional part and expense being the spring, and that so trifling as not to be worthy of notice. Therefore, without additional cost I have produced a reliable trace-lock.

I do not broadly claim the arrangement of the tongue so that it may be turned and locked; but

Having thus fully described the same, what I claim as new and useful, and desire to secure by Letters Patent, is—

The combination of the tongue C, and the ferrule or socket B, constructed with ears $d$ and notches $a$, and the spring in the rear of the tongue, when the shank E is enlarged within the socket, and so as to operate substantially in the manner and for the purpose specified.

DANIEL TUTTLE.

Witnesses:
JOHN H. SHUMWAY,
ALTSEE J. TIBBITS.